US011075856B2

(12) United States Patent
Tanaka et al.

(10) Patent No.: US 11,075,856 B2
(45) Date of Patent: Jul. 27, 2021

(54) SWITCH DEVICE AND COMMUNICATION CONTROL METHOD

(71) Applicants: Sumitomo Electric Industries, Ltd., Osaka (JP); AUTONETWORKS TECHNOLOGIES, LTD., Yokkaichi (JP); SUMITOMO WIRING SYSTEMS, LTD., Yokkaichi (JP)

(72) Inventors: Yuya Tanaka, Osaka (JP); Akihito Iwata, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/476,131

(22) PCT Filed: Nov. 24, 2017

(86) PCT No.: PCT/JP2017/042224
§ 371 (c)(1),
(2) Date: Jul. 5, 2019

(87) PCT Pub. No.: WO2018/128027
PCT Pub. Date: Jul. 12, 2018

(65) Prior Publication Data
US 2019/0356608 A1    Nov. 21, 2019

(30) Foreign Application Priority Data
Jan. 6, 2017   (JP) .............................. JP2017-001309

(51) Int. Cl.
*H04L 12/947*  (2013.01)
*H04W 4/40*   (2018.01)
(Continued)

(52) U.S. Cl.
CPC ............... *H04L 49/25* (2013.01); *H04B 7/15* (2013.01); *H04L 49/90* (2013.01); *H04W 4/40* (2018.02); *H04W 24/08* (2013.01)

(58) Field of Classification Search
CPC . H04L 47/00–829; H04L 49/25; H04L 49/90; H04B 7/14–15; H04W 4/40–48; H04W 24/08
See application file for complete search history.

(56) References Cited

U.S. PATENT DOCUMENTS

| 8,861,366 | B1* | 10/2014 | Olenz | ................. | H04L 43/0882 370/237 |
| 2004/0028048 | A1* | 2/2004 | Jin | ........................ | H04L 12/462 370/392 |

(Continued)

FOREIGN PATENT DOCUMENTS

JP    2013-168865 A    8/2013

*Primary Examiner* — Michael Thier
*Assistant Examiner* — Prince A Mensah
(74) *Attorney, Agent, or Firm* — Baker Botts L.L.P.; Michael A. Sartori

(57) ABSTRACT

This switch device is mounted on a vehicle, and comprises: a switch unit for relaying communication data communicated between a plurality of communication devices; a buffer for holding the communication data to be relayed; and a control unit for transmitting stop request to at least one communication device of the plurality of communication devices if communication data to be transmitted to a communication device in which abnormality has been detected is held in the buffer, the stop request which requests for stopping transmission of communication data to the switch (Continued)

device and for holding of communication data to be transmitted to the switch device.

9 Claims, 12 Drawing Sheets

(51) Int. Cl.
 *H04B 7/15* (2006.01)
 *H04L 12/861* (2013.01)
 *H04W 24/08* (2009.01)

(56) References Cited

U.S. PATENT DOCUMENTS

| | | | |
|---|---|---|---|
| 2004/0179476 A1* | 9/2004 | Kim | H04L 47/10 370/230 |
| 2009/0066494 A1* | 3/2009 | Ishikawa | G01S 7/529 340/438 |
| 2010/0057292 A1* | 3/2010 | Ishikawa | G07C 5/085 701/31.4 |
| 2010/0215043 A1* | 8/2010 | Hisada | H04L 12/40 370/392 |
| 2013/0060418 A1* | 3/2013 | Nomura | G05B 23/0264 701/33.4 |
| 2017/0369043 A1* | 12/2017 | Otake | B60K 28/06 |

* cited by examiner

FIG. 3

| RECEPTION SOURCE MAC ADDRESS | TRANSMISSION DESTINATION MAC ADDRESS |
|---|---|
| MAC ADDRESS OF IMAGE SENSOR 111B | MAC ADDRESS OF AUTONOMOUS DRIVING ECU 111C |
| MAC ADDRESS OF RADAR DEVICE 111D | MAC ADDRESS OF AUTONOMOUS DRIVING ECU 111C |
| MAC ADDRESS OF OUT-OF-VEHICLE COMMUNICATION DEVICE 111A | MAC ADDRESS OF NAVIGATION DEVICE 111E |

Tab1

FIG. 7

| RECEPTION SOURCE MAC ADDRESS | TRANSMISSION DESTINATION MAC ADDRESS |
|---|---|
| MAC ADDRESS OF IMAGE SENSOR 111B | MAC ADDRESS OF AUTONOMOUS DRIVING ECU 111C |
| MAC ADDRESS OF RADAR DEVICE 111D | MAC ADDRESS OF AUTONOMOUS DRIVING ECU 111C |
| MAC ADDRESS OF OUT-OF-VEHICLE COMMUNICATION DEVICE 111A | MAC ADDRESS OF NAVIGATION DEVICE 111E |
| MAC ADDRESS OF OUT-OF-VEHICLE COMMUNICATION DEVICE 111A | MAC ADDRESS OF CENTRAL GATEWAY 111F |

Tab3

SWITCH DEVICE AND COMMUNICATION CONTROL METHOD

CROSS-REFERENCE TO RELATED APPLICATIONS

This application is the national phase under 35 U.S.C. § 371 of PCT International Application No. PCT/JP2017/042224 which has an International filing date of Nov. 24, 2017 and designated the United States of America.

FIELD

The present invention relates to a switch device and a communication control method.

This application claims the priority based on Japanese Patent Application No. 2017-1309 filed on Jan. 6, 2017, and its disclosure is incorporated herein in its entirety.

BACKGROUND

Japanese Patent Application Laid-Open Publication No. 2013-168865 discloses the following on-vehicle network system. In other words, the on-vehicle network system is equipped with an on-vehicle control device having a memory for storing definition data defining portions that are included in communication protocols for use on an on-vehicle network and depend on implementation on the on-vehicle network and a communication protocol issuing device for issuing the definition data to the on-vehicle control device.

Upon receiving a registration request requesting to make the on-vehicle control device participate in the on-vehicle network from a registration device for making the on-vehicle control device participate in the on-vehicle network, the communication protocol issuing device performs authentication to the registration device, creates the definition data conforming to the implementation on the on-vehicle network and transmits the definition data to the registration device as a reply. The registration device receives the definition data transmitted by the communication protocol issuing device and requests the on-vehicle control device to store the received definition data on the memory. After that, the on-vehicle control device receives the definition data from the registration device, stores the definition data on the memory, and performs communication using the on-vehicle network while conforming to the communication protocols.

SUMMARY (1) A switch device of the present disclosure is mounted on a vehicle, and includes: a switch unit for relaying the communication data communicated between a plurality of communication devices; a buffer for holding the communication data to be relayed; and a control unit for transmitting stop request to at least one communication device of the plurality of communication devices if communication data to be transmitted to a device in which abnormality has been detected is held in the buffer, the stop request requesting for stopping transmission of communication data to the switch device and requesting for holding of communication data to be transmitted to the switch device, and the one communication device being located on a path from the switch device to a transmission source of the communication data and being mounted on the vehicle.

(8) A communication control method of the present disclosure, in a switch device to be mounted on a vehicle and having a buffer for holding communication data to be relayed, includes the steps of: relaying communication data communicated between a plurality of communication devices; and transmitting stop request to at least one communication device of the plurality of communication devices if communication data to be transmitted to a device in which abnormality has been detected is held in the buffer, the stop request requesting for stopping transmission of communication data to the switch device and requesting for holding of communication data to be transmitted to the switch device and the one communication device being located on a path from the switch device to a transmission source of the communication data and being mounted on the vehicle.

(9) A communication control program of the present disclosure, for use in a switch device to be mounted on a vehicle and having a buffer for holding communication data to be relayed makes a computer function as: a switch unit for relaying communication data communicated between a plurality of communication devices; and a control unit for transmitting stop request to at least one communication device of the plurality of communication devices if the communication data to be transmitted to a device in which abnormality has been detected is held in the buffer, the stop request requesting for stopping transmission of communication data to the switch device and requesting for holding of communication data to be transmitted to the switch device and the one communication device being located on a path from the switch device to a transmission source of the communication data and being mounted on the vehicle.

An embodiment of the present disclosure can be achieved not only as the switch device equipped with these characteristic processing units but also as an on-vehicle communication system equipped with the switch device. Furthermore, the embodiment of the present disclosure can be achieved as a semiconductor integrated circuit achieving part of or whole of the switch device.

BRIEF DESCRIPTION OF THE DRAWINGS

FIG. 3 is a view showing an example of a communication path table that is managed by a control unit in the switch ECU according to the first embodiment of the present invention;

FIG. 7 is a view showing an example of a communication path table that is managed by the control unit in a modified example of the switch ECU according to the first embodiment of the present invention;

DETAILED DESCRIPTION

Figure 1:
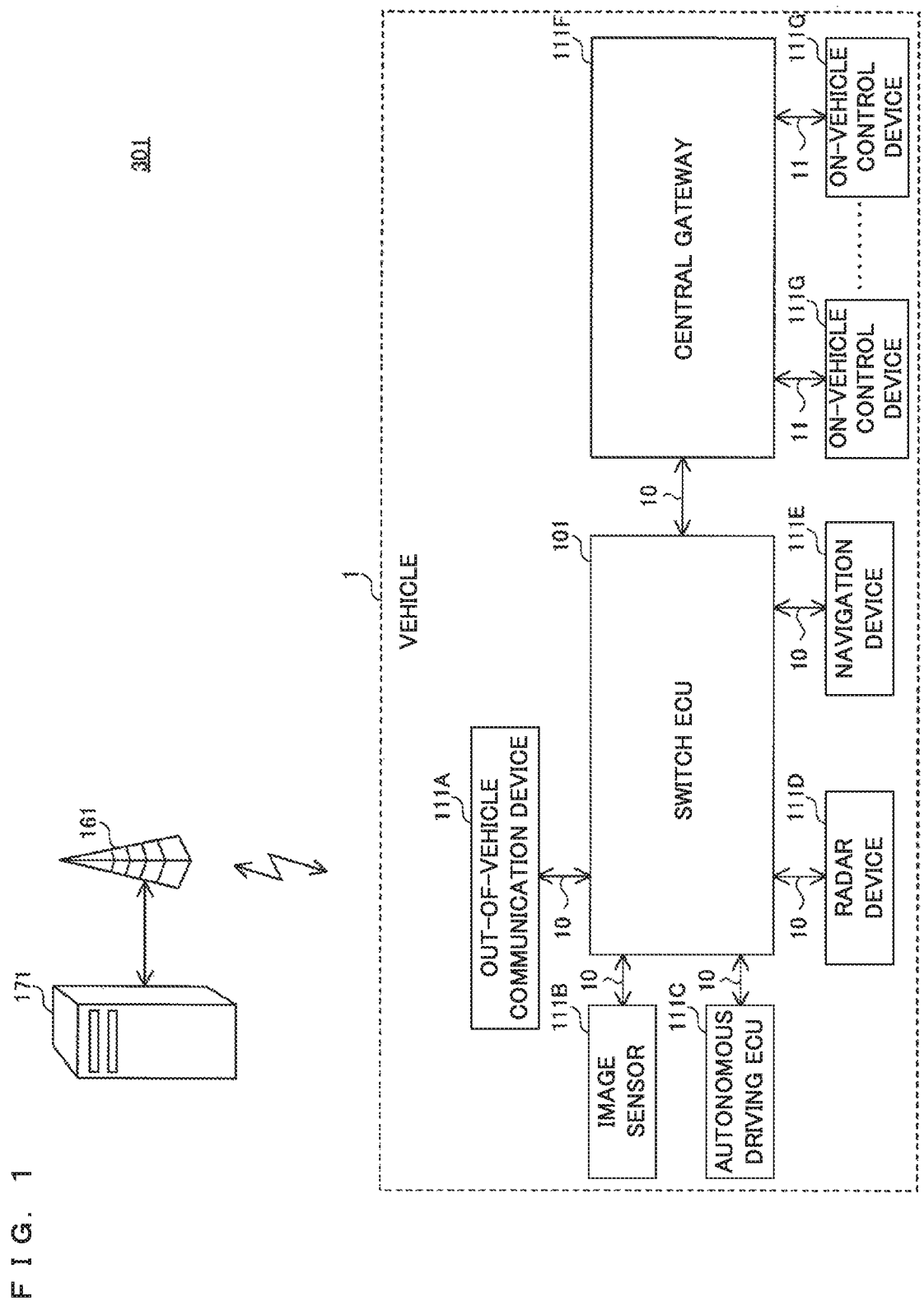
FIG. 1 is a view showing a configuration of an on-vehicle communication system according to a first embodiment of the present invention.

Conventionally, on-vehicle network systems for improving security in on-vehicle networks have been developed.

The on-vehicle network described in Patent Document 1 is provided with a communication gateway for relaying communication data to be transmitted and received between on-vehicle ECUs (Electronic Control Units).

For example, if abnormality has occurred in an on-vehicle ECU that receives communication data from another device via a communication gateway, since the on-vehicle ECU cannot receive the communication data, the communication data may sometimes be discarded on the way of the communication path. In this case, the retransmission of the communication data occurs, and the communication band in the on-vehicle network is wasted.

This disclosure is intended to solve the above-mentioned problems, and an object thereof is to provide a switch device, a communication control method and a communication control program capable of efficiently transmitting information in an on-vehicle network.

With the present disclosure, information can be transmitted efficiently in an on-vehicle network.

Description of an Embodiment of the Present Invention

First, the contents of an embodiment of the present invention will be listed and described.

(1) A switch device according to one embodiment of the present invention is mounted on a vehicle, and includes: a switch unit for relaying the communication data communicated between a plurality of communication devices; a buffer for holding communication data to be relayed; and a control unit for transmitting stop request to at least one communication device of the plurality of communication devices if communication data to be transmitted to a device in which abnormality has been detected is held in the buffer, the stop request requesting for stopping transmission of communication data to the switch device and requesting for holding of communication data to be transmitted to the switch device, and the one communication device being located on a path from the switch device to a transmission source of the communication data and being mounted on the vehicle.

With this configuration, since transmission of the communication data can be stopped and holding of the communication data can be performed for the communication device, the communication data can be prevented from being discarded on the way of the communication path. Hence, since the retransmission of the communication data can be prevented, wasteful use of the communication band in the on-vehicle network can be suppressed. Consequently, information can be transmitted efficiently in the on-vehicle network.

(2) Preferably, the control unit transmits the stop request to the one communication device capable of communicating with an external device outside the vehicle.

With this configuration, since retransmission of, for example, communication data to be charged can be prevented between an external device and a communication device capable of communicating with the external device, increase in communication cost can be suppressed.

(3) Preferably, the one communication device is located on the path and is a first communication device on the path from the switch device.

With this configuration, since the switch device can specify transmission destination of the stop request without recognizing the connection relationship of the on-vehicle network, the switch device can transmit the stop request by performing simple processing.

(4) Preferably, the control unit transmits the stop request regularly or irregularly and stops transmission of the stop request if restoration from the abnormality of the device is detected.

With this configuration, when the communication device has not become received the stop request from the switch device, the communication device can recognize that the communication device is in a state wherein the transmission of the communication data should be restarted. Hence, the communication device can simply restart the transmission of the communication data to the restored device.

(5) Preferably, even if the communication data to be transmitted to a device in which abnormality has been detected is held in the buffer, if the communication data transmitted from the communication device and to be transmitted to another device in which no abnormality has been detected is held in the buffer, the control unit does not transmit the stop request.

With this configuration, the transmission of, for example, important communication data to be transmitted from the communication device to the other device can be prevented from becoming stagnant.

(6) Preferably, the switch device further includes a detection unit for detecting abnormality of the device directly connected to the switch device.

With this configuration, the processing for detecting the device in which abnormality has occurred can be simplified.

(7) Preferably, the switch device further includes a detection unit for detecting abnormality of a device connected to the switch device via at least one communication device.

With this configuration, it is possible to continue the communication between the communication device provided between the switch device and the device in which abnormality has been detected and the switch device can be continued, regardless of the presence/absence of the stop request.

(8) A communication control method according to one embodiment of the present invention, in a switch device to be mounted on a vehicle and having a buffer for holding communication data to be relayed, includes the steps of: relaying communication data communicated between a plurality of communication devices; and transmitting stop request to at least one communication device of the plurality of communication devices if communication data to be transmitted to a device in which abnormality has been detected is held in the buffer, the stop request requesting for stopping transmission of communication data to the switch device and requesting for holding of communication data to be transmitted to the switch device and the one communication device being located on a path from the switch device to a transmission source of the communication data and being mounted on the vehicle.

With this configuration, since the transmission of the communication data can be stopped and the holding of the communication data can be performed for the communication device, the communication data can be prevented from being discarded on the way of the communication path. Hence, since the retransmission of the communication data can be prevented, wasteful use of the communication band in the on-vehicle network can be suppressed. Consequently, information can be transmitted efficiently in the on-vehicle network.

(9) A communication control program according to one embodiment of the present invention, for use in a switch device to be mounted on a vehicle and having a buffer for holding communication data to be relayed, is a computer program for making a computer function as: a switch unit for relaying communication data communicated between a plurality of communication devices, and a control unit for transmitting stop request to at least one communication device of the plurality of communication devices if communication data to be transmitted to a device in which abnormality has been detected is held in the buffer, the stop request requesting for stopping transmission of communication data to the switch device and requesting for holding of communication data to be transmitted to the switch device and the one communication device being located on a path from the switch device to a transmission source of the communication data and being mounted on the vehicle.

With this configuration, since transmission of the communication data can be stopped and holding of the communication data can be performed for the communication device, the communication data can be prevented from being discarded on the way of the communication path. Hence, since the retransmission of the communication data can be prevented, wasteful use of the communication band in the on-vehicle network can be suppressed. Consequently, information can be transmitted efficiently in the on-vehicle network.

The embodiments of the present invention will be described below referring to the drawings. The same or equivalent components in the drawings are designated by the same reference numerals, and the descriptions thereof are not repeated. Furthermore, at least portions of the embodiments described below may be combined arbitrarily.

First Embodiment

[Configuration and Basic Operation]

FIG. 1 is a view showing a configuration of an on-vehicle communication system according to a first embodiment of the present invention.

Referring to FIG. 1, an on-vehicle communication system 301 is equipped with a switch ECU 101 and a plurality of on-vehicle devices 111. The on-vehicle communication system 301 is mounted on a vehicle 1.

The switch ECU 101, an out-of-vehicle communication device 111A, an image sensor 111B, an autonomous driving ECU 111C, a radar device 111D, a navigation device 111E, a central gateway 111F, and a plurality of on-vehicle control devices 111G are examples of the on-vehicle devices 111 and are also examples of communication devices.

The on-vehicle devices 111, however, are not limited to these specific examples, but may be other devices mounted on the vehicle 1 and being capable of communicating with the switch ECU 101.

The switch ECU 101 is connected to the out-of-vehicle communication device 111A, the image sensor 111B, the autonomous driving ECU 111C, the radar device 111D, the navigation device 111E and a central gateway 111F, for example, by Ethernet (registered trademark) cables 10.

The switch ECU 101 can communicate with these on-vehicle devices 111 connected thereto. Information is exchanged between the switch ECU 101 and the on-vehicle devices 111, for example, by using Ethernet frames.

The central gateway 111F is connected to the plurality of on-vehicle control devices 111G via, for example, CAN buses 11 conforming to the CAN (Controller Area Network) (registered trademark) standard. Information is exchanged for example, by using messages conforming to the CAN standard between the central gateway 111F and the on-vehicle control devices 111G.

Examples of the on-vehicle control devices 111G include an engine control device, an AT (Automatic Transmission) control device, an HEV (Hybrid Electronic Vehicle) control device, a brake control device, a chassis control device, a steering control device, an instrument display control device, and a theft detection device.

The central gateway 111F performs information relay processing, for example, between the on-vehicle control devices 111G respectively connected to different CAN buses 11 and also performs information relay processing between the switch ECU 101 and the on-vehicle control devices 111G. Information to be transmitted via the CAN buses 11 is hereafter also referred to as CAN information.

The switch ECU 101 performs relay processing for relaying communication data received from the on-vehicle devices 111 connected thereto.

In more detail, the image sensor 111B, the autonomous driving ECU 111C, the radar device 111D, the navigation device 111E and the central gateway 111F belong to a VLAN (Virtual Local Area Network) 1. Moreover, the out-of-vehicle communication device 111A belongs to a VLAN 2 that is different from the VLAN 1.

The switch ECU 101, for example, relays Ethernet frames between the on-vehicle devices 111 belonging to the same VLAN.

More specifically, the switch ECU 101 transmits the Ethernet frames to the destination on-vehicle device 111 on the basis of the transmission source MAC (Media Access Control) address and the destination MAC address included in the received Ethernet frames.

The image sensor 111B is, for example, a photographing device for periodically photographing the surroundings of the vehicle 1. The image sensor 111B photographs the surroundings of the vehicle 1 and creates image information indicating the result of the photographing and creates Ethernet frames including the created image information and having the MAC address of the autonomous driving ECU 111C as the destination MAC address. The image sensor 111B transmits the created Ethernet frames to the switch ECU 101.

Upon receiving the Ethernet frames from the image sensor 111B, the switch ECU 101 transmits the Ethernet frames to the autonomous driving ECU 111C on the basis of the destination MAC address included in the received Ethernet frames.

The radar device 111D is, for example, a radar device using millimeter waves and periodically creates detection information indicating the detection result of an object, such as a pedestrian, in the surroundings of the vehicle 1.

The radar device 111D creates Ethernet frames including the created detection information and having the MAC address of the autonomous driving ECU 111C as the destination MAC address and transmits the created Ethernet frames to the switch ECU 101.

Upon receiving the Ethernet frames from the radar device 111D, the switch ECU 101 transmits the Ethernet frames to the autonomous driving ECU 111C on the basis of the destination MAC address included in the received Ethernet frames.

The out-of-vehicle communication device 111A can communicate with a server 171 serving as an example of the external device outside the vehicle 1. Furthermore, the out-of-vehicle communication device 111A is located on the communication data path from the server 171 to the switch ECU 101.

More specifically, the out-of-vehicle communication device 111A is, for example, a TCU (Telematics Communication Unit) and can perform wireless communication with a wireless base station device 161 according to a communication standard, such as LTE (Long Term Evolution) or 3G.

The out-of-vehicle communication device 111A can communicate with the server 171 via the wireless base station device 161.

The server 171 transmits, for example, the IP packets including map information and having the IP address of the navigation device 111E as the destination IP address to the out-of-vehicle communication device 111A via the wireless base station device 161.

Upon receiving the IP packets from the server 171, the out-of-vehicle communication device 111A transmits the received IP packets to, for example, the switch ECU 101 serving as a default gateway.

More specifically, the out-of-vehicle communication device 111A creates Ethernet frames including the IP packets and having the MAC address of the switch ECU 101 as the destination MAC address and transmits the Ethernet frames to the switch ECU 101.

The switch ECU 101, for example, relays IP packets between the on-vehicle devices 111 belonging to different VLANs.

In more detail, upon receiving the Ethernet frames from the out-of-vehicle communication device 111A, the switch ECU 101 acquires the IP packets from the received Ethernet frames.

The switch ECU 101 specifies that the destination of the IP packets is the navigation device 111E on the basis of the destination IP address of the acquired IP packets and transmits the IP packets to the navigation device 111E.

Although the on-vehicle communication system according to the embodiment of the present invention is configured so as to be provided with the central gateway 111F, the configuration of the system is not limited to this configuration. The on-vehicle communication system 301 may also be configured so as not to be provided with the central gateway 111F. In this case, for example, the switch ECU 101 relays CAN information to be transmitted via the CAN buses 11.

Figure 2:
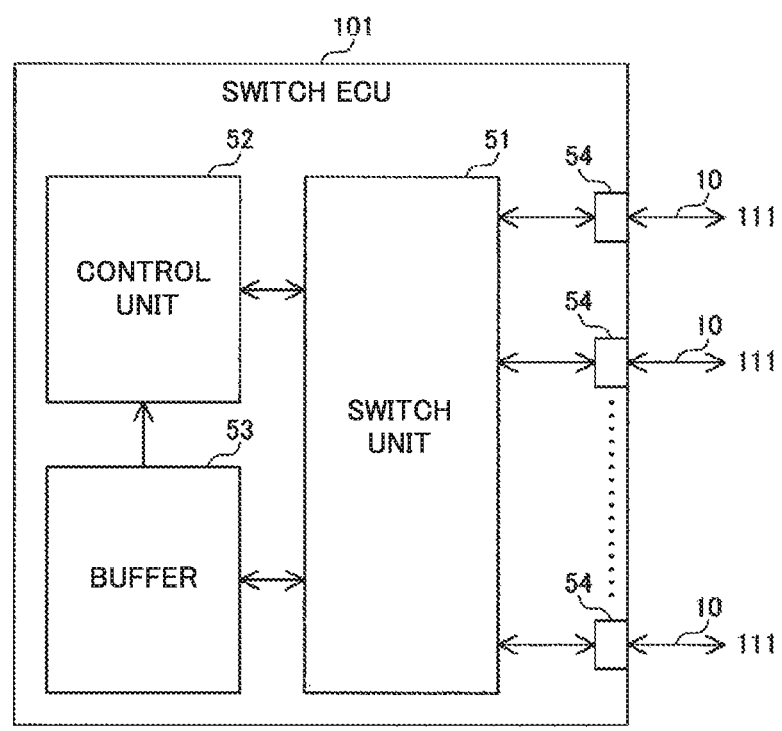
FIG. 2 is a view showing a configuration of a switch ECU in the on-vehicle communication system according to the first embodiment of the present invention.

FIG. 2 is a view showing a configuration of the switch ECU in the on-vehicle communication system according to the first embodiment of the present invention.

Referring to FIG. 2, the switch ECU 101 is equipped with a switch unit 51, a control unit (detection unit) 52, a buffer (holding unit) 53, and a plurality of communication ports 54.

The switch ECU 101 functions as a switch device. In more detail, the communication ports 54 in the switch ECU 101 are terminals to which, for example, the Ethernet cables 10 can be connected. The communication ports 54 may be terminals of an integrated circuit.

Each of the plurality of communication ports 54 is connected to any one of the plurality of on-vehicle devices 111 via the Ethernet cable 10. Furthermore, each of the plurality of communication ports 54 is, for example, made to correspond to the VLAN.

The switch unit 51 performs relay processing for relaying communication data. The buffer 53 holds the communication data to be relayed.

In more detail, the switch unit 51 operates, for example, as an L2 switch and relays Ethernet frames between the on-vehicle devices 111 belonging to the same VLAN.

More specifically, the switch unit 51 holds an address table indicating, for example, the correspondence relationship among the port numbers of the communication ports 54, the IDs of the VLANs and the MAC addresses of the connection destination devices.

Upon receiving, for example, the Ethernet frames from the image sensor 111B, the switch unit 51 stores the received Ethernet frames in the buffer 53 and confirms the destination MAC address of the Ethernet frames.

The switch unit 51 specifies the communication port 54 corresponding to the confirmed destination MAC address by referring to the address table. The switch unit 51, herein, specifies the communication port 54 connected to the autonomous driving ECU 111C.

After that, the switch unit 51 acquires the Ethernet frames from the buffer 53 and transmits the acquired Ethernet frames to the autonomous driving ECU 111C via the specified communication port 54.

Upon receiving, for example, the Ethernet frames from the radar device 111D, the switch unit 51 stores the received Ethernet frames in the buffer 53 and confirms the destination MAC address of the Ethernet frames.

The switch unit 51 specifies the communication port 54 corresponding to the confirmed destination MAC address, that is, the communication port 54 connected to the autonomous driving ECU 111C, by referring to the address table.

After that, the switch unit 51 acquires the Ethernet frames from the buffer 53 and transmits the acquired Ethernet frames to the autonomous driving ECU 111C via the specified communication ports 54.

Furthermore, the switch unit 51 operates, for example, as an L3 switch or an L4 switch and relays communication data between the on-vehicle devices 111 belonging to different VLANs.

More specifically, the switch unit 51 holds the network table indicating, for example, the correspondence relationship between the IDs of the VLANs and network addresses. Moreover, the switch unit 51 holds an ARP (Address Resolution Protocol) table indicating, for example, the correspondence relationship between IP addresses and MAC addresses for each ID of the VLAN.

Upon receiving the Ethernet frames from the out-of-vehicle communication device 111A, the switch unit 51 confirms that the destination MAC address is its own MAC address and extracts IP packets from the received Ethernet frames.

The switch unit 51 specifies the ID of the VLAN corresponding to the destination IP address included in the IP packets by referring to the network table.

And then, the switch unit 51 acquires the MAC address corresponding to the destination IP address by referring to the ARP table corresponding to the ID of the specified VLAN.

The switch unit 51 creates Ethernet frames including the acquired MAC address as the destination MAC address and also including the IP packets and stores the Ethernet frames in the buffer 53.

The switch unit 51 specifies the communication port 54 corresponding to the destination MAC address, that is, the communication port 54 connected to the navigation device 111E, by referring to the address table.

After that, the switch unit 51 acquires the Ethernet frames from the buffer 53 and transmits the acquired Ethernet frames to the navigation device 111E via the specified communication port 54.

FIG. 3 is a view showing an example of a communication path table that is managed by the control unit in the switch ECU according to the first embodiment of the present invention.

Referring to FIG. 3, the control unit 52 holds, for example, a communication path table Tab1. The control unit 52 monitors the relay processing in the switch unit 51, thereby acquiring the communication path of communication data to be relayed in the switch unit 51, and registering the communication path in the communication path table Tab1.

More specifically, upon confirming, for example, that the switch unit 51 has stored the Ethernet frames received from the image sensor 111B via the communication port 54 corresponding thereto in the buffer 53, the control unit 52 confirms the destination MAC address of the Ethernet frames stored in the buffer 53, that is, the MAC address of the autonomous driving ECU 111C.

And then, the control unit 52 refers to the address table being held in the switch unit 51 and acquires the MAC address of the image sensor 111B from the port number of the above-mentioned corresponding communication port 54. The control unit 52 registers the MAC address of the image sensor 111B and the MAC address of the autonomous driving ECU 111C in the communication path table Tab1 as the "reception source MAC address" and the "transmission destination MAC address", respectively.

Similarly, upon confirming, for example, that the switch unit 51 has stored the Ethernet frames received from the radar device 111D in the buffer 53, the control unit 52 registers the MAC address of the radar device 111D and the MAC address of the autonomous driving ECU 111C in the communication path table Tab1 as the "reception source MAC address" and the "transmission destination MAC address", respectively.

Similarly, upon confirming, for example, that the switch unit 51 has stored the Ethernet frames received from the out-of-vehicle communication device 111A in the buffer 53, the control unit 52 registers the MAC address of the out-of-vehicle communication device 111A and the MAC address of the navigation device 111E in the communication path table Tab1 as the "reception source MAC address" and the "transmission destination MAC address", respectively.

When the Ethernet frames stored in the buffer 53 are transmitted to the destination on-vehicle device 111, the control unit 52 deletes the communication path corresponding to the Ethernet frames from the communication path table Tab1.

The control unit 52, however, is not limited to the configuration wherein immediately after the communication through the registered communication path is completed, the control unit 52 deletes the communication path, but the control unit 52 may also be configured so as to measure the time elapsed from the last communication and to delete the communication path in which the measured elapsed time becomes equal to a predetermined timeout time or more from the communication path table Tab1.

Furthermore, although the communication path is registered using the "reception source MAC address" and the "transmission destination MAC address", without being limited to this method, the communication path may also be registered using the port number of the reception source communication port 54 and the port number of the transmission destination communication port 54.

Referring again to FIG. 2, the control unit 52, for example, detects abnormality of the on-vehicle devices 111 directly connected to the switch ECU 101.

More specifically, the control unit 52, for example, refers to the address table held by the switch unit 51 and periodically transmits existence confirmation information for existence confirmation to the on-vehicle devices 111 directly connected to the switch ECU 101 via the switch unit 51.

The control unit 52 decides that no abnormality has occurred in an on-vehicle device 111 from which the control unit 52 has been able to receive the response to the existence confirmation information via the switch unit 51. On the other hand, the control unit 52 decides that abnormality has occurred in an on-vehicle device 111 from which the control unit 52 has not been able to receive the response to the existence confirmation information via the switch unit 51.

Figure 4:
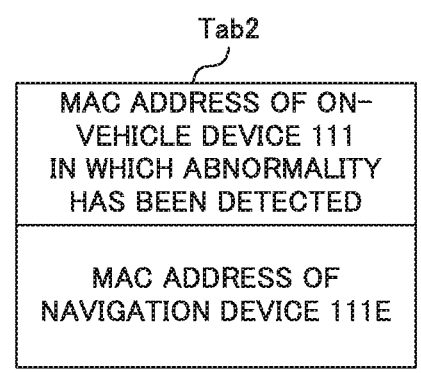
FIG. 4 is a view showing an example of an abnormality table that is managed by the control unit in the switch ECU according to the first embodiment of the present invention.

FIG. 4 is a view showing an example of an abnormality table that is managed by the control unit in the switch ECU according to the first embodiment of the present invention.

Referring to FIG. 4, the control unit 52, for example, holds an abnormality table Tab2. The control unit 52 registers the MAC address of an on-vehicle device 111 in which abnormality has been detected in the abnormality table Tab2.

In this example, the control unit 52, for example, detects that abnormality has occurred in the navigation device 111E and registers the MAC address of the navigation device 111E in the abnormality table Tab2.

Referring again to FIG. 2, if the communication data to be transmitted to an on-vehicle device 111 in which abnormality has been detected is held in the buffer 53, the control unit 52 transmits stop request requesting for stopping transmission of communication data to the switch ECU 101 and requesting for holding of communication data to be transmitted to the switch ECU 101 to one communication device located on the path from the switch ECU 101 to the transmission source of the communication data and mounted on the vehicle 1.

In more detail, the control unit 52, for example, periodically transmits the stop request from the switch ECU 101 to the communication device located on the path to the transmission source of the communication data, the communication device is the first communication device on the path from the switch ECU 101.

More specifically, the control unit 52, for example, transmits a pause (Pause) frame serving as an example of the stop request to the out-of-vehicle communication device 111A.

In more detail, the control unit 52 compares the communication path table Tab1 and the abnormality table Tab2 and performs confirmation processing for confirming whether a MAC address (hereafter also referred to as an unreceivable address) being registered as the "transmission destination MAC address" in the communication path table Tab1 and also registered in the abnormality table Tab2 exists or not.

Upon confirming the existence of the unreceivable address, the control unit 52 decides that the communication data to be transmitted to the on-vehicle device 111 in which abnormality has been detected is held in the buffer 53.

In this example, the control unit 52 confirms the MAC address of the navigation device 111E as the unreceivable address.

The control unit 52 specifies the transmission source on-vehicle device 111 by referring to the communication path table Tab1. More specifically, the control unit 52 specifies the MAC address (hereafter also referred to as the pause request destination address) corresponding to the unreceivable address in the item of the "transmission destination MAC address" in the communication path table Tab1.

In this example, the control unit 52 specifies the MAC address of the out-of-vehicle communication device 111A as the pause request destination address.

And then, the control unit 52 refers to the address table being held in the switch unit 51 and acquires the port number corresponding to the MAC address of the specified out-of-vehicle communication device 111A.

The control unit 52, for example, periodically creates a pause frame, outputs the created pause frame to the switch unit 51 and notifies the acquired port number to the switch unit 51.

Upon receiving the pause frame from the control unit 52, the switch unit 51 transmits the received pause frame to the out-of-vehicle communication device 111A via the communication port 54 having the port number notified from the control unit 52.

For example, if restoration from the abnormality of the navigation device 111E is detected, the control unit 52 stops the transmission of the pause frame.

In more detail, the control unit 52, for example, decides that the abnormality in the navigation device 111E continues until the control unit 52 becomes to be able to receive, from the navigation device 111E via the switch unit 51, the response to the existence confirmation information being transmitted periodically.

And then, when the control unit 52 becomes to be able to receive the response to the existence confirmation information from the navigation device 111E, the control unit 52 decides that the navigation device 111E has been restored from the abnormality, stops the transmission of the pause frame to the out-of-vehicle communication device 111A and deletes the MAC address of the out-of-vehicle communication device 111A from the abnormality table Tab2.

Referring again to FIG. 1, the out-of-vehicle communication device 111A has a buffer, not shown; upon receiving the pause frame from the switch ECU 101, the out-of-vehicle communication device 111A stores the IP packets received from the server 171 via the wireless base station device 161 in the buffer according to the received pause frame.

While periodically receiving the pause frame from the switch ECU 101, the out-of-vehicle communication device 111A continues to store the IP packets in the buffer. And then, when the out-of-vehicle communication device 111A does not receive the pause frame from the switch ECU 101 anymore, the out-of-vehicle communication device 111A transmits the IP packets stored in the buffer sequentially to the switch ECU 101.

Furthermore, for example, a communication connection has been established between the server 171 and the navigation device 111E, and reception confirmation is performed.

More specifically, each time when the navigation device 111E receives the IP packets from the server 171, the navigation device 111E transmits ACK to the server 171.

Upon receiving ACK from the navigation device 111E, the server 171 recognizes that the transmitted IP packets have been received safely by the navigation device 111E.

On the other hand, if ACK cannot be received from the navigation device 111E even after a predetermined timeout time has elapsed, the server 171 recognizes that the transmitted IP packets have not been received by the navigation device 111E and retransmits the IP packets.

For example, if the navigation device 111E cannot transmit ACK due to the occurrence of abnormality, the out-of-vehicle communication device 111A, instead of the navigation device 111E, may transmit ACK to the server 171 within the predetermined timeout time.

This can prevent the retransmission of the IP packets from the server 171 to the navigation device 111E, whereby it is possible to suppress the increase in the communication load and the increase in the communication cost between the wireless base station device 161 and the out-of-vehicle communication device 111A.

Although the control unit 52 is configured so as to perform monitoring until the navigation device 111E in which abnormality has occurred is restored automatically, the configuration thereof is not limited to this configuration. The control unit 52, for example, may also be configured so as to forcibly restore the navigation device 111E by transmitting a restoration instruction for resetting the navigation device 111E to the navigation device 111E. Furthermore, the control unit 52 may also be configured, for example, so as to turn on and off the power source of the navigation device 111E instead of transmitting the restoration instruction.

Moreover, although the control unit 52 operates so as to detect the abnormality of the navigation device 111E and to transmit the pause frame to the out-of-vehicle communication device 111A serving as the transmission source of the communication data to be transmitted to the navigation device 111E, the operation of the control unit 52 is not limited to this operation. The control unit 52 may also be configured so as to detect abnormality in another on-vehicle device 111 and to transmit the pause frame to the communication device serving as the transmission source of the communication data to be transmitted to the other on-vehicle device 111.

More specifically, the control unit 52 may also be configured so as to detect abnormality of the autonomous driving ECU 111C and to transmit the pause frame to the image sensor 111B and the radar device 111D, i.e., the communication devices serving as the transmission sources of the communication data to be transmitted to the autonomous driving ECU 111C.

[Operation Flow]

Each of the devices in the on-vehicle communication system 301 is equipped with a computer, and the arithmetic processing unit, such as a CPU, in the computer reads a program including part of or all of the steps of the following sequence diagram or flow chart from a memory, not shown, and executes the program. Each of the programs of the plurality of devices can be installed from the outside. Each of the programs of the plurality of devices is distributed in a state of being stored on a recording medium.

Figure 5:
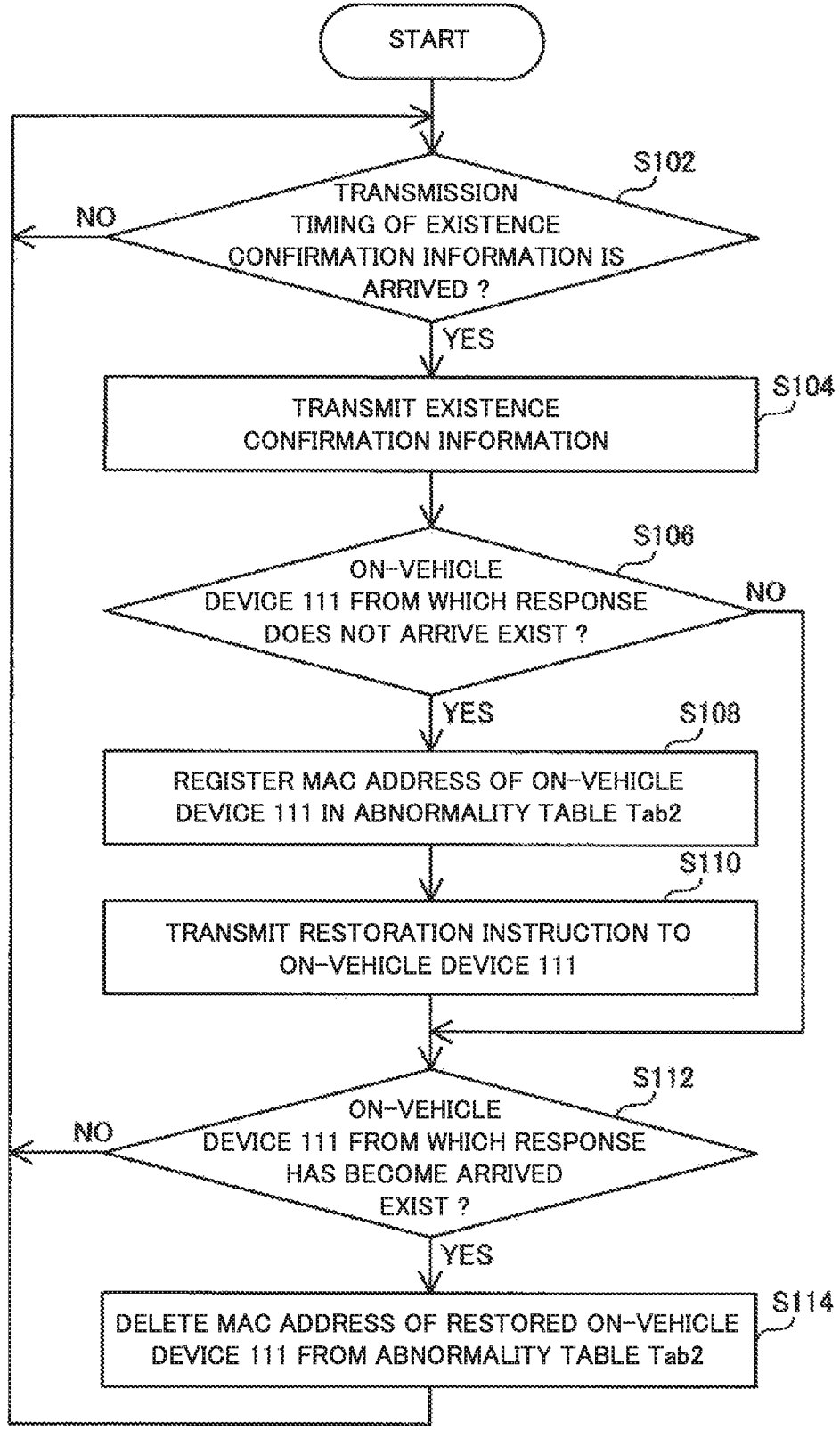
FIG. 5 is a flow chart specifying the operation procedure at the time when the switch ECU in the on-vehicle communication system according to the first embodiment of the present invention detects abnormality of a device.

FIG. 5 is a flow chart specifying the operation procedure at the time when the switch ECU in the on-vehicle communication system according to the first embodiment of the present invention detects abnormality of a device.

Referring to FIG. 5, first, the switch ECU 101 stands by until the arrival of the transmission timing of the existence confirmation information that is transmitted every predetermined period (NO at step S102).

And then, when the transmission timing of the existence confirmation information arrives (YES at step S102), the switch ECU 101 transmits the existence confirmation information to each on-vehicle device 111 connected thereto (at step S104).

Next, if an on-vehicle device 111 from which the response to the existence confirmation information does not arrive anymore exists (YES at step S106), the switch ECU 101 decides that abnormality has occurred in the on-vehicle device 111 and registers the MAC address of the on-vehicle device 111 in the abnormality table Tab2 (at step S108).

Next, the switch ECU 101 transmits the restoration instruction to the on-vehicle device 111 (at step S110).

Next, if an on-vehicle device 111, from which the response does not arrive, does not exist (NO at step S106) or after the transmission of the restoration instruction to the on-vehicle device 111 (at step S110), the switch ECU 101 performs the following processing.

In other words, if an on-vehicle device 111, from which the response has become arrived, exists (YES at step S112), the switch ECU 101 decides that the on-vehicle device 111 has been restored and deletes the MAC address of the restored on-vehicle device 111 from the abnormality table Tab2 (at step S114).

Next, if an on-vehicle device 111, from which the response has become arrived, does not exist (NO at step S112) or after the deletion (at step S114) of the MAC address of the restored on-vehicle device 111 from the abnormality table Tab2 (at step S114), the switch ECU 101 stands by until the arrival of new transmission timing of the existence confirmation information (NO at step S102).

The order of the above-mentioned steps S108 and S110 is not limited to the above-mentioned order but the order may be changed.

Figure 6:
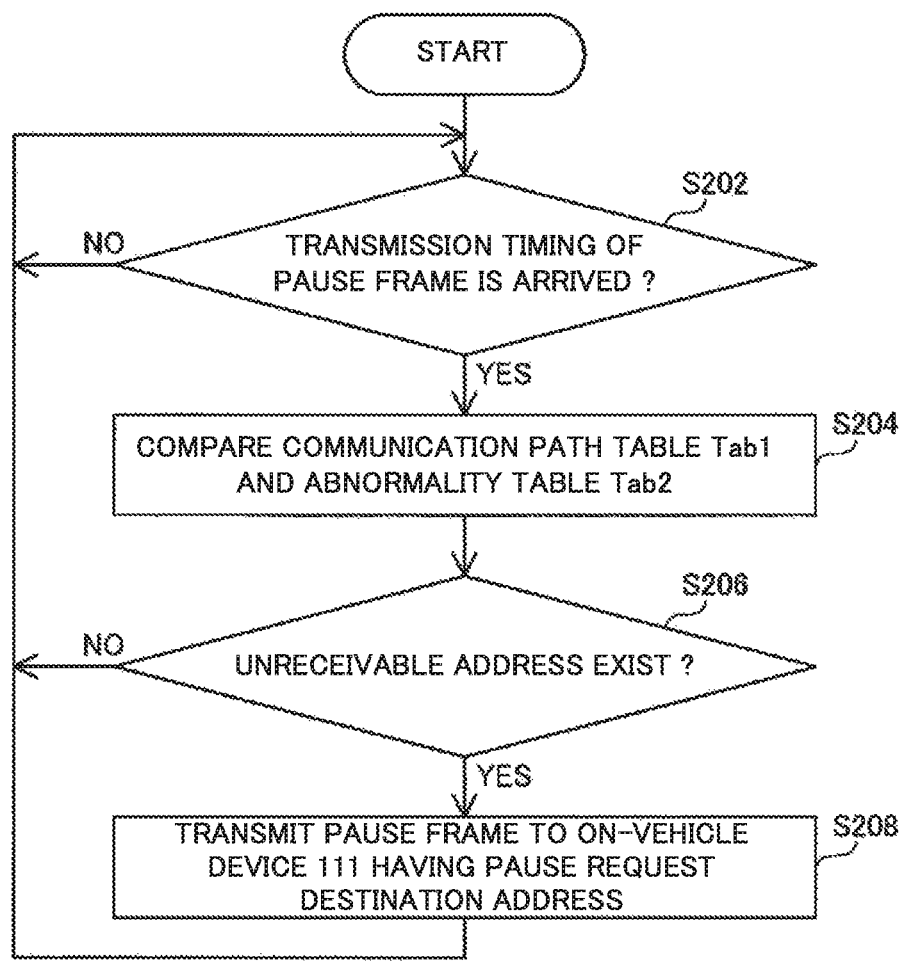
FIG. 6 is a flow chart specifying the operation procedure at the time when the switch ECU in the on-vehicle communication system according to the first embodiment of the present invention transmits a pause frame.

FIG. 6 is a flow chart specifying the operation procedure at the time when the switch ECU in the on-vehicle communication system according to the first embodiment of the present invention transmits the pause frame.

Referring to FIG. 6, a situation is assumed in which the switch ECU 101 is monitoring the communication path table Tab1 and the abnormality table Tab2.

First, the switch ECU 101 stands by until the arrival of the transmission timing of the pause frame that is transmitted every predetermined period (NO at step S202).

And then, when the transmission timing of the pause frame arrives (YES at step S202), the switch ECU 101 compares the communication path table Tab1 and the abnormality table Tab2 (at step S204).

Next, if an unreceivable address exists (YES at step S206), the switch ECU 101 acquires the pause request destination address corresponding to the unreceivable address from the communication path table Tab1 and transmits the pause frame to the on-vehicle device 111 having the acquired pause request destination address (at step S208).

Next, if an unreceivable address does not exist (NO at step S206) or after the transmission of the pause frame (at step S208), the switch ECU 101 stands by until the arrival of new transmission timing of the pause frame (NO at step S202).

[Modified Example of the Switch ECU 101]

Referring again to FIG. 1, for example, a situation is assumed in which an on-vehicle control device 111G is receiving communication data for updating its own firmware from the server 171 via the wireless base station device 161, the out-of-vehicle communication device 111A, the switch ECU 101 and the central gateway 111F.

Referring again to FIG. 2, for example, even if the communication data to be transmitted to an on-vehicle device 111 in which abnormality has been detected is held in the buffer 53, if the communication data having been transmitted from the out-of-vehicle communication device 111A and to be transmitted to another on-vehicle device 111 in which no abnormality has been detected is held in the buffer 53, the control unit 52 does not transmit the stop request.

FIG. 7 is a view showing an example of a communication path table that is managed by the control unit in a modified example of the switch ECU according to the first embodiment of the present invention.

Referring to FIG. 7, in a communication path table Tab3, the MAC address of the out-of-vehicle communication device 111A and the MAC address of the central gateway 111F are further registered as "the reception source MAC address" and the "transmission destination MAC address", respectively, in comparison with the communication path table Tab1.

The control unit 52, for example, compares the communication path table Tab3 and the abnormality table Tab2 (see FIG. 4) and performs confirmation processing for confirming whether an unreceivable address exists.

And then, the control unit 52 confirms the MAC address of the navigation device 111E as the unreceivable address and decides that the communication data to be transmitted to the navigation device 111E in which abnormality has been detected is held in the buffer 53.

Referring to the communication path table Tab3, the control unit 52 specifies the MAC address of the out-of-vehicle communication device 111A as the pause request destination address corresponding to the unreceivable address in the item of the "transmission destination MAC address", that is, the MAC address of the navigation device 111E.

Furthermore, in the item of the "reception source MAC address", the control unit 52 confirms whether the MAC address (hereafter also referred to as the second pause request destination address) of the out-of-vehicle communication device 111A has been registered in addition to the MAC address of the out-of-vehicle communication device 111A corresponding to the MAC address of the navigation device 111E.

In this example, the control unit 52 confirms that the second pause request destination address has been registered. The "transmission destination MAC address" corresponding to the second pause request destination address is the MAC address of the central gateway 111F.

On the basis of the result of the confirmation, the control unit 52 decides that the communication data having been transmitted from the out-of-vehicle communication device 111A and to be transmitted to the central gateway 111F in which no abnormality has been detected is held in the buffer 53, and then determines so as not to transmit the pause frame to the out-of-vehicle communication device 111A.

Figure 8:
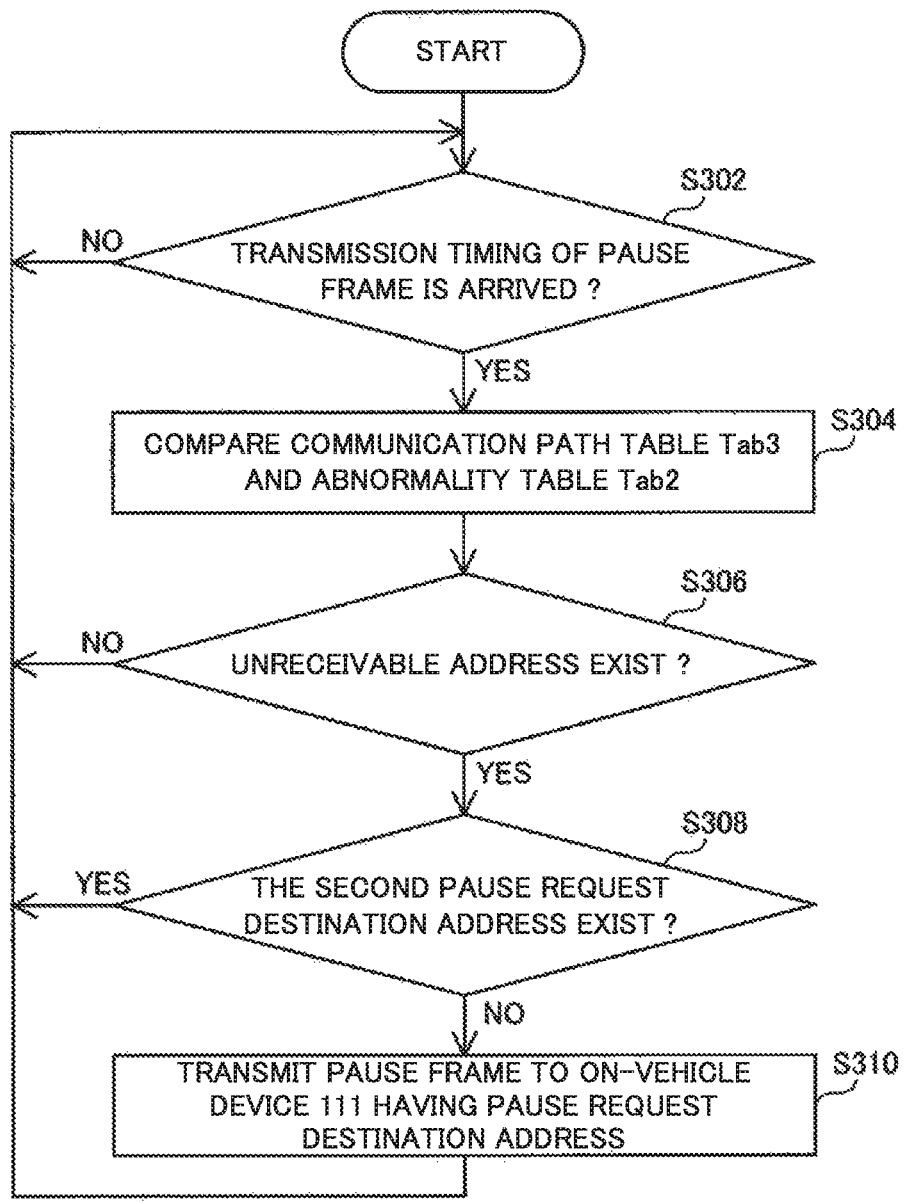
FIG. 8 is a flow chart specifying the operation procedure at the time when the modified example of the switch ECU in the on-vehicle communication system according to the first embodiment of the present invention transmits the pause frame.

FIG. 8 is a flow chart specifying the operation procedure at the time when the modified example of the switch ECU in the on-vehicle communication system according to the first embodiment of the present invention transmits the pause frame.

Referring to FIG. 8, a situation is assumed in which the switch ECU 101 is monitoring the communication path table Tab3 and the abnormality table Tab2.

First, the switch ECU 101 stands by until the arrival of the transmission timing of the pause frame that is transmitted every predetermined period (NO at step S302).

And then, when the transmission timing of the pause frame arrives (YES at step S302), the switch ECU 101 compares the communication path table Tab3 and the abnormality table Tab2 (at step S304).

Next, if an unreceivable address exists and the second pause request destination address does not exist (YES at step S306 and NO at step 308), the switch ECU 101 acquires the pause request destination address corresponding to the unreceivable address from the communication path table Tab3 and transmits the pause frame to the on-vehicle device 111 having the acquired pause request destination address (at step S310).

On the other hand, if an unreceivable address does not exist (NO at step S306) and if an unreceivable address exists and the second pause request destination address exists (YES at step S306 and YES at step 308) or after the transmission of the pause frame (at step S310), the switch ECU 101 stands by until the arrival of new transmission timing of the pause frame (NO at step S302).

In the switch ECU 101 according to the first embodiment of the present invention, although the control unit 52 is configured so as to communicate with another communication device and another on-vehicle device 111 via the switch unit 51, the configuration of the control unit 52 is not limited to this configuration. The control unit 52 may also be configured so as to communicate with at least either one of another communication device and another on-vehicle device 111 using a dedicated communication path different from the Ethernet cable 10 and the CAN bus 11.

Furthermore, in the switch ECU according to the first embodiment of the present invention, although the control unit 52 is configured so as to periodically create and transmit the pause frame, the configuration of the control unit 52 is not limited to this configuration. The control unit 52 may also be configured so as to irregularly create and transmit the pause frame or may also be configured so as to create and transmit the pause frame only once.

Moreover, although the on-vehicle communication system according to the first embodiment of the present invention is configured so as to be provided with the plurality of on-vehicle devices 111, the configuration of the system is not limited to this configuration, but the system may also be configured so as to be provided with one on-vehicle device 111.

What's more, although the on-vehicle communication system according to the first embodiment of the present invention is configured so as to be provided with the plurality of communication devices, the configuration of the system is not limited to this configuration. The system may also be configured so as to be provided with one communication device.

What's more, although the on-vehicle communication system according to the first embodiment of the present invention is configured so as to detect the abnormality of an on-vehicle device 111 using the Ethernet cable 10, the configuration of the system is not limited to this configuration. The on-vehicle communication system 301 may also be configured so as to detect the abnormality of an on-vehicle device 111 using a dedicated communication line connected between the switch ECU 101 and each on-vehicle device 111.

The on-vehicle network described in patent document 1, however, is provided with a communication gateway for relaying communication data to be transmitted and received between the on-vehicle ECUs.

For example, if abnormality has occurred in an on-vehicle ECU that receives communication data from another device via the communication gateway, since the on-vehicle ECU cannot receive the communication data, the communication data may sometimes be discarded on the way of the communication path. In this case, the retransmission of the communication data occurs, and the communication band in the on-vehicle network is wasted.

On the other hand, the switch ECU according to the first embodiment of the present invention is mounted on the vehicle 1. The buffer 53 holds communication data to be relayed. The switch unit 51 relays the communication data. And then, if the communication data to be transmitted to an on-vehicle device 111 in which abnormality has been detected is held in the buffer 53, the control unit 52 transmits the pause frame serving as an example of the stop request requesting for stopping transmission of communication data to the switch ECU 101 and requesting the holding of communication data to be transmitted to the switch ECU 101 to at least one communication device located on the path from the switch ECU 101 to the transmission source of the communication data and mounted on the vehicle 1.

With this configuration, since the transmission of the communication data can be stopped and the holding of the communication data can be performed for the communication device, the communication data can be prevented from being discarded on the way of the communication path. Hence, since the retransmission of the communication data can be prevented, wasteful use of the communication band in the on-vehicle network can be suppressed. Consequently, information can be transmitted efficiently in the on-vehicle network.

Furthermore, in the switch ECU 101 according to the first embodiment of the present invention, the control unit 52 transmits the pause frame to the communication device capable of communicating with the external device outside the vehicle 1.

With this configuration, since the retransmission of, for example, communication data to be charged can be prevented between an external device and a communication device capable of communicating with the external device, increase in communication cost can be suppressed.

Moreover, in the switch ECU according to the first embodiment of the present invention, the control unit 52 transmits the pause frame to the first communication device from the switch ECU 101 and located on the above-mentioned path.

With this configuration, since the switch ECU 101 can specify the transmission destination of the pause frame without recognizing the connection relationship of the on-vehicle network, the switch ECU 101 can transmit the pause frame by performing simple processing.

What's more, in the switch ECU according to the first embodiment of the present invention, the control unit 52 transmits the pause frame periodically or irregularly. After that, if the restoration from the abnormality of an on-vehicle device 111 is detected, the control unit 52 stops the transmission of the pause frame.

With this configuration, when the communication device has not become received the pause frame from the switch ECU 101, the communication device can recognize that the communication device is in a state wherein the transmission of the communication data should be restarted. Hence, the communication device can simply restart the transmission of the communication data to the restored on-vehicle device 111.

In addition, in the switch ECU according to the first embodiment of the present invention, even if the communication data to be transmitted to an on-vehicle device 111 in which abnormality has been detected is held in the buffer 53, if the communication data transmitted from the communication device and to be transmitted to another on-vehicle device 111 in which no abnormality has been detected is held in the buffer 53, the control unit 52 does not transmit the pause frame.

With this configuration, the transmission of, for example, important communication data to be transmitted from the communication device to the other device can be prevented from becoming stagnant.

Still further, in the switch ECU according to the first embodiment of the present invention, the control unit 52 detects abnormality of the on-vehicle device 111 directly connected to the switch ECU 101.

With this configuration, the processing for detecting the on-vehicle device 111 in which abnormality has occurred can be simplified.

Next, another embodiment of the present invention will be described below referring to the drawings. The same or equivalent components in the drawings are designated by the same reference numerals, and the descriptions thereof are not repeated.

Second Embodiment

This embodiment relates to an on-vehicle communication system equipped with a plurality of switch ECUs, unlike the on-vehicle communication system according to the first embodiment. This on-vehicle communication system is similar to the on-vehicle communication system according to the first embodiment, except for the following descriptions.

[Configuration and Basic Operation]

Figure 9:
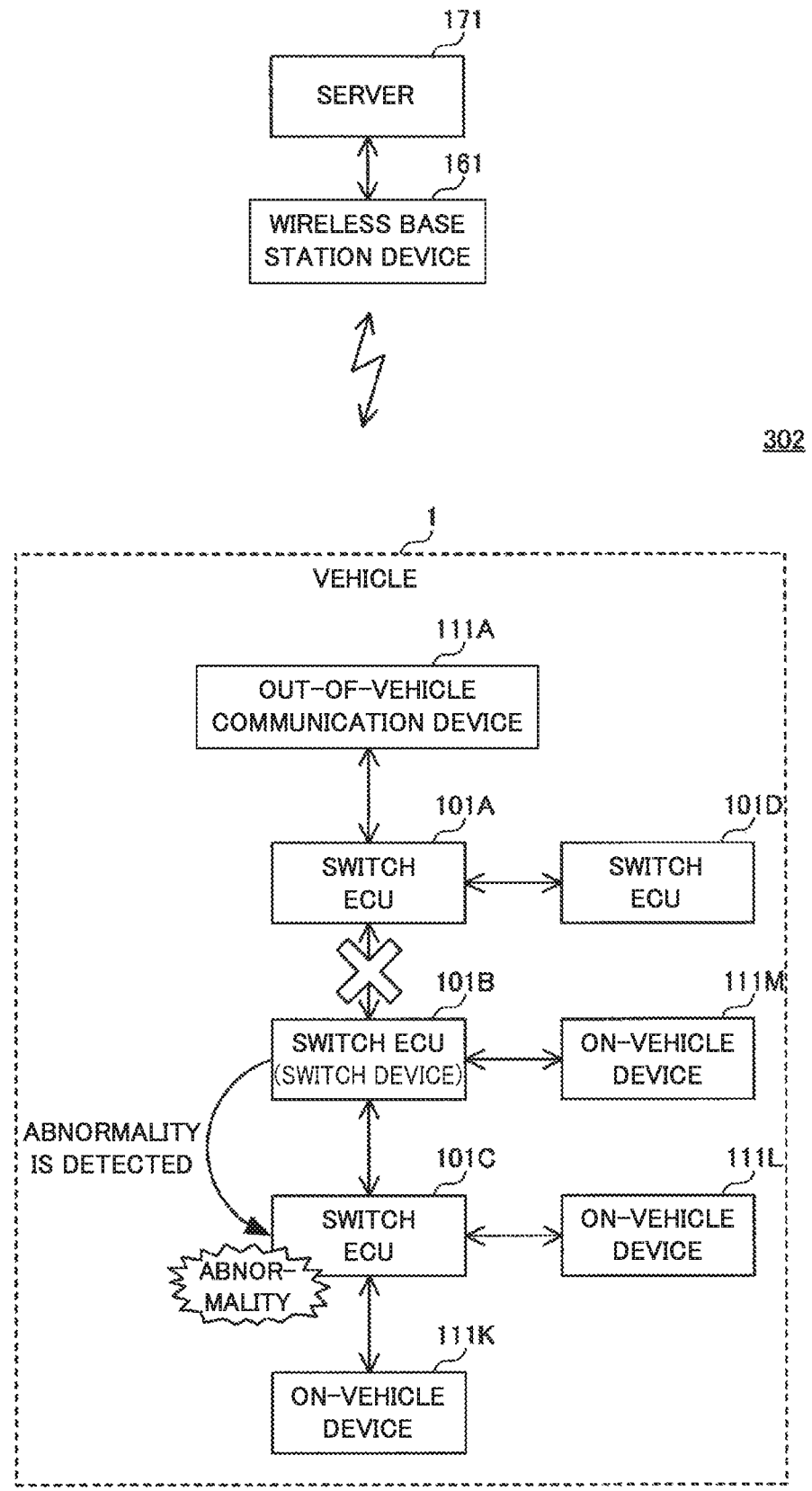
FIG. 9 is a view showing transmission example 1 of the pause frame in the on-vehicle communication system according to a second embodiment of the present invention.

FIG. 9 is a view showing transmission example 1 of the pause frame in the on-vehicle communication system according to the second embodiment of the present invention.

Referring to FIG. 9, an on-vehicle communication system 302 is equipped with switch ECUs 101A, 101B, 101C and 101D, each serving as the switch ECU 101, and on-vehicle devices 111K, 111L and 111M, each serving as the on-vehicle device 111. The on-vehicle communication system 302 is mounted on the vehicle 1.

For example, a situation is assumed in which communication data is being transmitted from the server 171 by using the on-vehicle device 111K as the destination.

In the transmission example 1, the switch ECU 101B functions as the switch device. In more detail, the control unit 52 in the switch ECU 101B, for example, detects abnormality of the on-vehicle device 111 directly connected to the switch ECU 101B.

More specifically, for example, when abnormality occurs in the switch ECU 101C, the switch ECU 101B detects the abnormality of the switch ECU 101C and transmits the pause frame to the switch ECU 101A.

Upon receiving the pause frame from the switch ECU 101B, the switch ECU 101A stores the communication data received from the server 171 via the wireless base station device 161 and the on-vehicle device 111A in the buffer 53 according to the received pause frame.

As described above, since the switch ECU 101B is herein configured so as to detect the abnormality of the on-vehicle device 111 directly connected thereto, that is, the switch ECU 101C, it is possible to simplify the processing for detecting the on-vehicle device 111 in which the abnormality has occurred.

Although the switch ECU 101B is configured so as to detect the abnormality of the switch ECU 101C in the transmission example 1, the configuration is not limited to this configuration. The switch ECU 101C may also be configured so as to notify its own abnormality to the switch ECU 101B.

Figure 10:
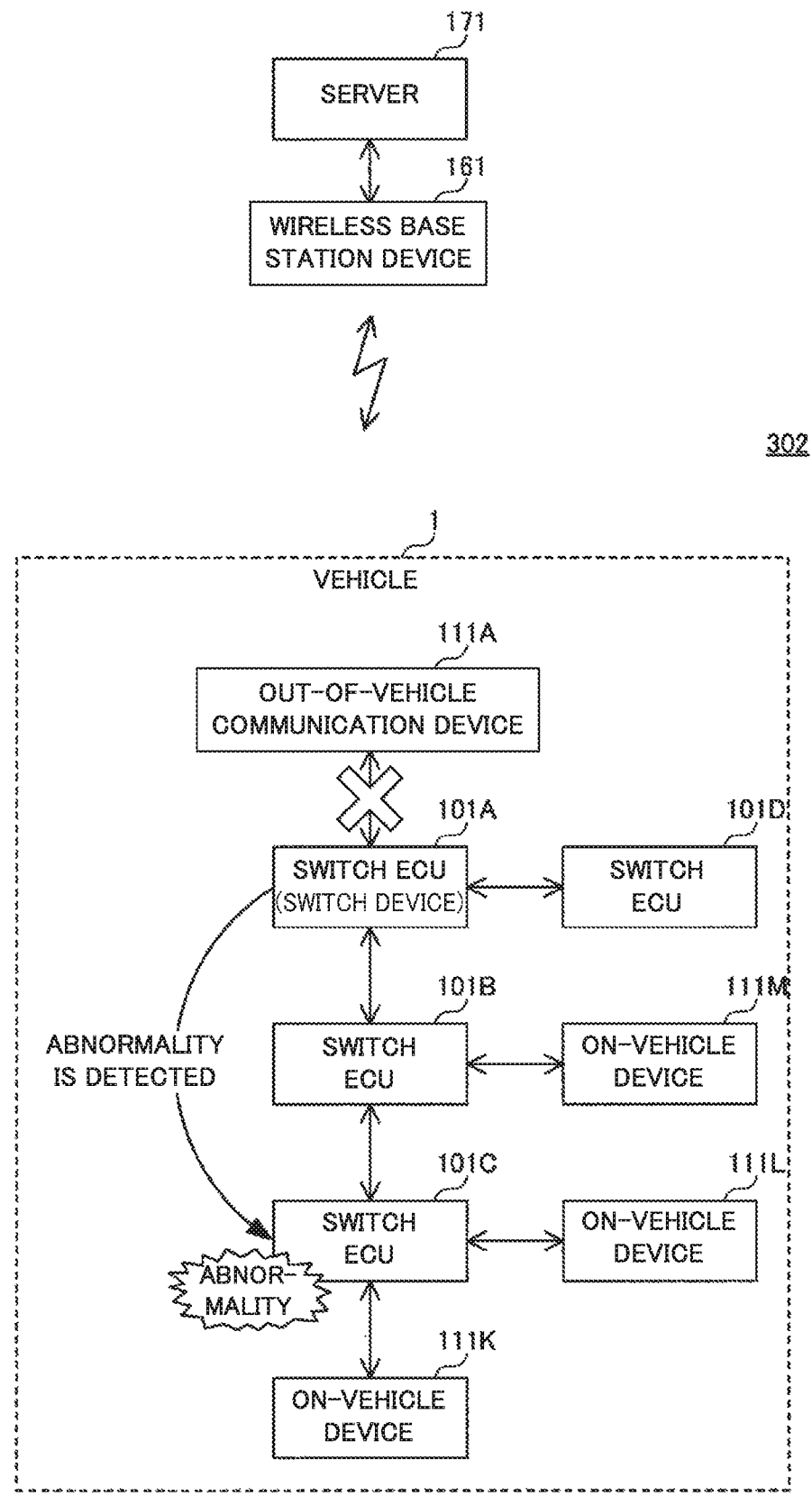
FIG. 10 is a view showing transmission example 2 of the pause frame in the on-vehicle communication system according to the second embodiment of the present invention.

FIG. 10 is a view showing transmission example 2 of the pause frame in the on-vehicle communication system according to the second embodiment of the present invention.

Referring to FIG. 10, for example, a situation is assumed in which communication data is being transmitted from the server 171 by using the on-vehicle device 111K as the destination. In the transmission example 2, the switch ECU 101A functions as the switch device.

[Problem]

As shown in FIG. 9, in the configuration wherein the switch ECU 101C in which the abnormality has been detected is directly connected to the switch device, that is, the switch ECU 101B, the communication path, for example, from the switch ECU 101D to the on-vehicle device 111M via the switch ECU 101A and the switch ECU 101B is interrupted.

On the other hand, the control unit 52 in the switch ECU 101A, for example, detects abnormality of the on-vehicle device 111 that is connected to the switch ECU 101A via at least one communication device.

In more detail, for example, the connection relationship between the various devices in the on-vehicle communication system 302 is fixed in advance.

Referring again to FIG. 2, the control unit 52, for example, holds connection information indicating the connection relationship and transmits the existence confirmation information to the switch ECU 101C and the on-vehicle devices 111K to 111M via the switch unit 51 on the basis of the connection information. The control unit 52 detects abnormality of an on-vehicle device 111 on the basis of the reception result responding to the existence confirmation information.

In the transmission example 2, the control unit 52, for example, detects abnormality of the switch ECU 101C. And then, the control unit 52 transmits the pause frame to the out-of-vehicle communication device 111A via the switch unit 51.

Upon receiving the pause frame from the switch ECU 101A, the out-of-vehicle communication device 111A stores the communication data received from the server 171 via the wireless base station device 161 in the buffer 53 according to the received pause frame.

As described above, since the switch ECU 101A is herein configured so as to detect the abnormality of the on-vehicle device 111 connected thereto via the switch ECU 101B, that is, the switch ECU 101C, it is possible to continue the communication between the switches ECU 101A and 101B, whereby it is possible to continuously use, for example, the communication path from the switch ECU 101D to the on-vehicle device 111M via the switch ECU 101A and the switch ECU 101B.

Although the switch ECU 101A is configured so as to detect the abnormality of the switch ECU 101C in the transmission example 2, the configuration is not limited to this configuration. The switch ECU 101B may also be configured so as to detect the abnormality of the switch ECU 101C and to notify the result of the detection to the switch ECU 101A or the switch ECU 101C may also be configured so as to notify its own abnormality to the switch ECU 101A.

Figure 11:
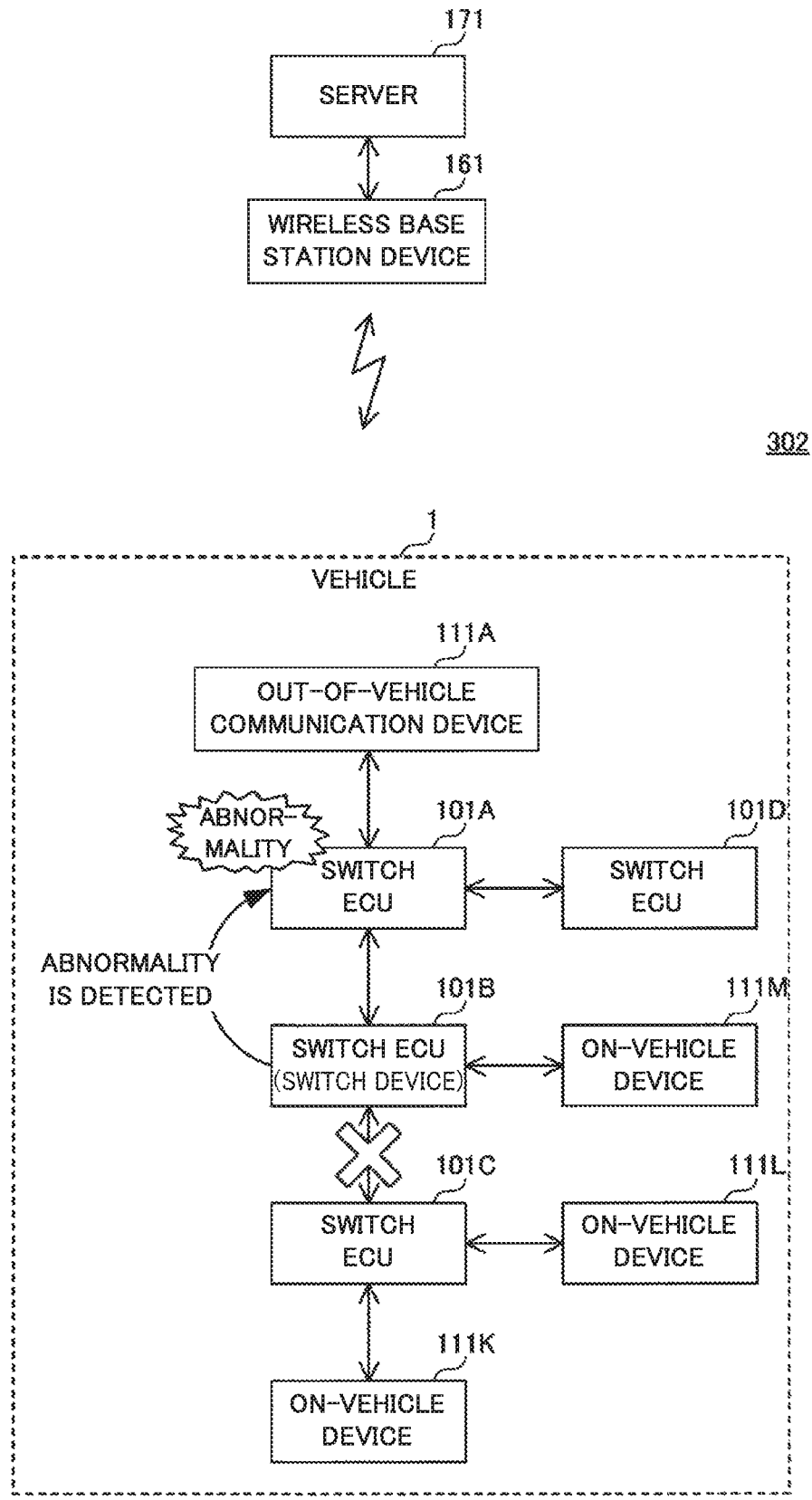
FIG. 11 is a view showing transmission example 3 of the pause frame in the on-vehicle communication system according to the second embodiment of the present invention.

FIG. 11 is a view showing transmission example 3 of the pause frame in the on-vehicle communication system according to the second embodiment of the present invention.

Referring to FIG. 11, for example, a situation is assumed in which communication data is being transmitted from the on-vehicle device 111K by using the server 171 as the destination.

In the transmission example 3, the switch ECU 101B functions as a switch device. In more detail, the control unit 52 in the switch ECU 101B, for example, detects abnormality of the on-vehicle device 111 directly connected to the switch ECU 101B.

More specifically, for example, when abnormality occurs in the switch ECU 101A, the switch ECU 101B detects the abnormality of the switch ECU 101A and transmits the pause frame to the switch ECU 101C.

Upon receiving the pause frame from the switch ECU 101B, the switch ECU 101C stores the communication data received from the on-vehicle device 111K in the buffer 53 according to the received pause frame.

As described above, since the switch ECU 101B is herein configured so as to detect the abnormality of the on-vehicle device 111 directly connected thereto, that is, the switch ECU 101A, it is possible to simplify the processing for detecting the on-vehicle device 111 in which the abnormality has occurred.

Although the switch ECU 101B is configured so as to detect the abnormality of the switch ECU 101A in the transmission example 3, the configuration is not limited to this configuration. The switch ECU 101A may also be configured so as to notify its own abnormality to the switch ECU 101B.

Figure 12:
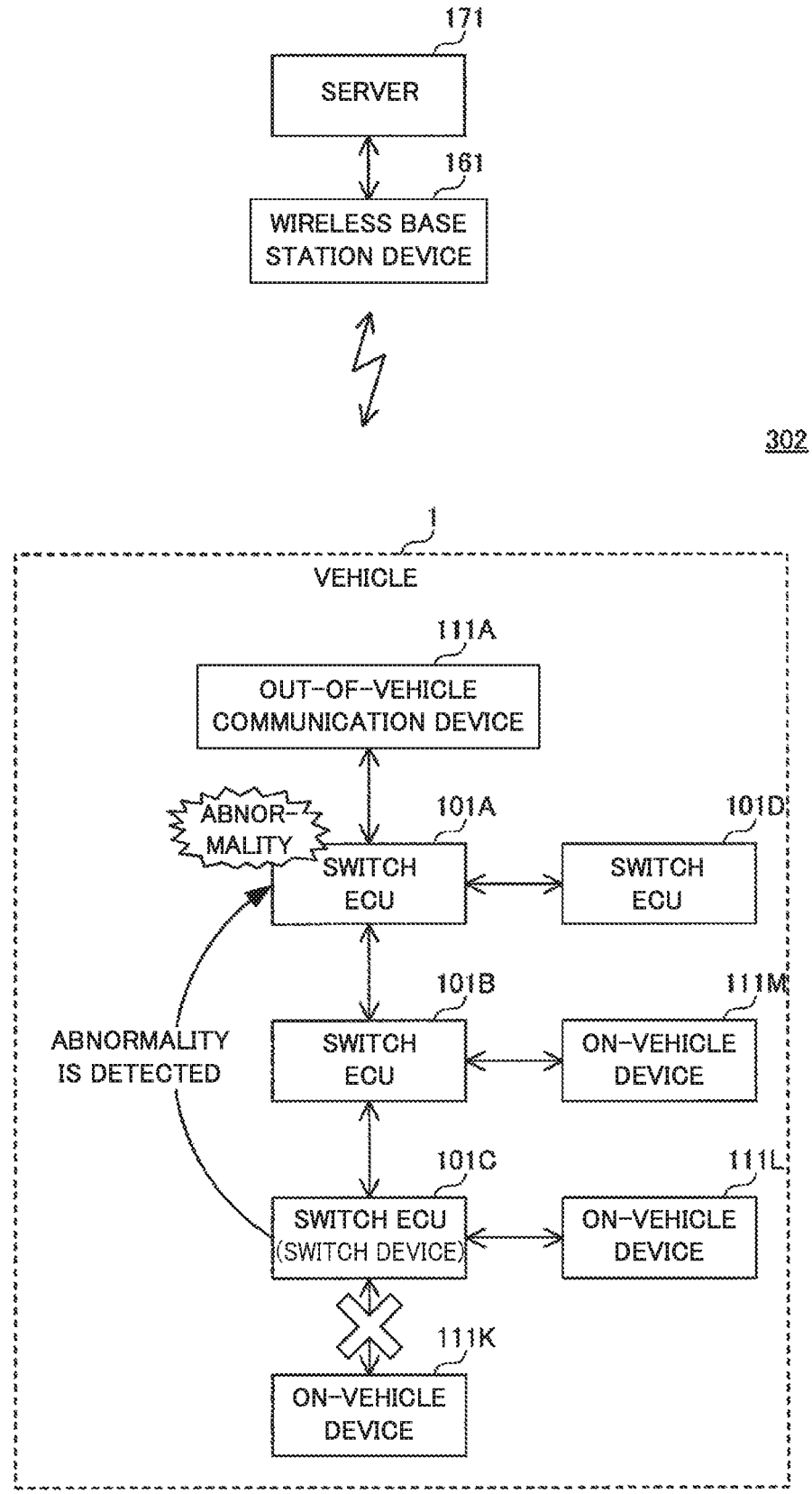
FIG. 12 is a view showing transmission example 4 of the pause frame in the on-vehicle communication system according to the second embodiment of the present invention.

FIG. 12 is a view showing transmission example 4 of the pause frame in the on-vehicle communication system according to the second embodiment of the present invention.

Referring to FIG. 12, for example, a situation is assumed in which communication data is being transmitted from the on-vehicle device 111K by using the server 171 as the destination. In the transmission example 4, the switch ECU 101C functions as a switch device.

[Problem]

As shown in FIG. 11, in the configuration wherein the switch ECU 101A in which the abnormality has been detected is directly connected to the switch device, that is, the switch ECU 101B, the communication path, for example, from the on-vehicle device 111L to the on-vehicle device 111M via the switch ECU 101C and the switch ECU 101B is interrupted as in the case shown in FIG. 9.

On the other hand, the control unit 52 in the switch ECU 101C, for example, detects abnormality of the on-vehicle device 111 connected to the switch ECU 101C via at least one communication device as in the case shown in FIG. 10.

More specifically, for example, when abnormality occurs in the switch ECU 101A, the switch ECU 101C detects the abnormality of the switch ECU 101A and transmits the pause frame to the on-vehicle device 111K.

Upon receiving the pause frame from the switch ECU 101C, the on-vehicle device 111K stores the communication data addressed to the server 171 in the buffer according to the received pause frame.

As described above, since the switch ECU 101C is herein configured so as to detect the abnormality of the on-vehicle device 111 connected thereto via the switch ECU 101B, that is, the switch ECU 101A, it is possible to continue the communication between the switches ECU 101B and 101C, whereby it is possible to continuously use, for example, the communication path from the on-vehicle device 111L to the on-vehicle device 111M via the switch ECU 101C and the switch ECU 101B.

In the on-vehicle communication system according to the second embodiment of the present invention, part or all of the components and operations in the transmission example 1 to the transmission example 4 can be combined appropriately.

Furthermore, in the switch ECU according to the first embodiment and the second embodiment, although the control unit 52 is configured so as to transmit the stop request to the communication device directly connected to the switch ECU 101B, the configuration of the control unit 52 is not limited to this configuration. The control unit 52 may also be configured so as to transmit the stop request to another communication device connected to the switch ECU 101 via at least one communication device.

More specifically, in the on-vehicle communication system 302 shown in FIG. 9, the control unit 52 in the switch ECU 101B transmits the stop request to the out-of-vehicle communication device 111A connected to the switch ECU 101B via the switch ECU 101A.

As described above, since the switch ECU 101B is configured so as to transmit the stop request to the out-of-vehicle communication device 111A connected thereto via the switch ECU 101A, it is possible to continue the communication between the switches ECU 101A and 101B, whereby it is possible to continuously use, for example, the communication path from the switch ECU 101D to the on-vehicle device 111M via the switch ECU 101A and the switch ECU 101B.

Moreover, in the switch ECU according to the first embodiment and the second embodiment, although the control unit 52 is configured so as to transmit the stop request to one communication device, the configuration of the control unit 52 is not limited to this configuration. The control unit 52 may also be configured so as to transmit the stop request to the plurality of communication devices located on the path from the switch ECU 101 to the transmission source of the communication data and mounted on the vehicle 1.

More specifically, in the on-vehicle communication system 302 shown in FIG. 9, the control unit 52 in the switch ECU 101B transmits the stop request to the switch ECU 101A and the out-of-vehicle communication device 111A.

As described above, in the switch ECU according to the second embodiment of the present invention, the control unit 52 detects the abnormality of the on-vehicle device 111 connected to the switch ECU 101 via at least one communication device.

With this configuration, it is possible to continue the communication between the communication device provided between the switch ECU 101 and the on-vehicle device 111 in which abnormality has been detected and the switch ECU 101, regardless of the presence/absence of the transmission of the pause frame.

Since the other configurations and operations are similar to those in the on-vehicle communication system according to the first embodiment, the detailed descriptions thereof are not repeated.

Part or all of the components and operations of the respective devices according to the first embodiment and the second embodiment of the present invention can be combined appropriately.

It is assumed that the above-mentioned embodiment is merely an example in all respects and not to be understood as limiting. The scope of the present invention is not defined by the above description, but by the appended claims, and includes all the changes within the meanings and ranges equivalent to the claims.

The above-mentioned description includes the features appended in the following supplementary notes.

[Supplementary Note 1]

A switch device to be mounted on a vehicle, being equipped with:

a holding unit for holding communication data to be relayed, a switch unit for performing relay processing for relaying the communication data, and a control unit for transmitting stop request to at least one communication device if communication data to be transmitted to a device in which abnormality has been detected is held in the holding unit, the stop request requesting for stopping transmission of communication data to the switch device and requesting for holding of communication data to be transmitted to the switch device, and the one communication device being located on the path from the switch device to the transmission source of the communication data and being mounted on the vehicle, wherein the switch device is a switch ECU, the device is a navigation device, the communication device is an out-of-vehicle communication device, and the stop request is a pause frame.

What is claimed is:

1. A switch device to be mounted on a vehicle, comprising:
    a switch circuit for relaying communication data communicated between a plurality of communication devices,
    a buffer for holding the communication data to be relayed, and
    a hardware processor coupled to a memory and configured to read instructions from the memory to cause the switch device to perform operations including:
    registering a reception source address and a transmission destination address of the communication data in a communication path table;
    transmitting existence confirmation information for existence confirmation to a device;
    detecting abnormality of the device by not receiving a response to the existence confirmation information, and registering an address of the device in which abnormality has been detected in an abnormality table;
    specifying, based on the communication path table, at least one communication device of the plurality of communication devices if communication data to be transmitted to the device whose address is registered in the abnormality table is held in the buffer, the at least one communication device being located on a path from the switch device to a transmission source of the communication data and being mounted on the vehicle; and
    transmitting, to the at least one communication device, a stop request for stopping transmission of communication data to the switch device and for holding of communication data to be transmitted to the switch device.

2. The switch device according to claim 1, wherein the operations include transmitting the stop request to the one communication device capable of communicating with an external device outside the vehicle.

3. The switch device according to claim 1, wherein the one communication device is located on the path and is a first communication device on the path from the switch device.

4. The switch device according to claim 1, wherein the operations include transmitting the stop request regularly or irregularly and stops transmission of the stop request if restoration from the abnormality of the device is detected.

5. The switch device according to claim 1, wherein even if the communication data to be transmitted to the device whose address is registered in the abnormality table is held in the buffer, if the communication data transmitted from the communication device and to be transmitted to another device in which no abnormality has been detected is held in the buffer, the stop request is not transmitted.

6. The switch device according to claim 1, wherein
    the operations include detecting abnormality of the device directly connected to the switch device.

7. The switch device according to claim 1, wherein
    the operations include detecting abnormality of a device connected to the switch device via at least one communication device.

8. The switch device according to claim 1, the abnormality of the device being an abnormality that has occurred within the device.

9. A communication control method in a switch device to be mounted on a vehicle and having a buffer for holding communication data to be relayed, comprising:
    relaying communication data communicated between a plurality of communication devices;
    registering a reception source address and a transmission destination address of the communication data in a communication path table;
    transmitting existence confirmation information for existence confirmation to a device;
    detecting abnormality of the device by not receiving a response to the existence confirmation information, and registering an address of the device in which abnormality has been detected in an abnormality table;
    specifying, based on the communication path table, at least one communication device of the plurality of communication devices if communication data to be transmitted to the device whose address is registered in the abnormality table is held in the buffer, the at least one communication device being located on a path from the switch device to a transmission source of the communication data and being mounted on the vehicle; and
    transmitting, to the at least one communication device, a stop request for stopping transmission of communication data to the switch device and for holding of communication data to be transmitted to the switch device.

* * * * *